United States Patent [19]
Johnson

[11] 3,835,985
[45] Sept. 17, 1974

[54] VACUUM ASSIST CAN UNSCRAMBLER

[75] Inventor: Ralph Ketchum Johnson, Palo Alto, Calif.

[73] Assignee: Wiebe Manufacturing, Inc., Palo Alto, Calif.

[22] Filed: June 19, 1972

[21] Appl. No.: 264,382

[52] U.S. Cl. .................. 198/33 AA, 198/33 AB
[51] Int. Cl. ............................................ B65g 47/24
[58] Field of Search............ 198/33 AA, 53, 54, 56, 198/57, 58, 19, 33 AB; 193/43 A

[56] References Cited
UNITED STATES PATENTS

| | | | |
|---|---|---|---|
| 3,285,387 | 11/1966 | Ochs | 198/33 AA |
| 3,300,195 | 1/1967 | Donovan et al. | 198/173 |
| 2,380,264 | 7/1945 | Richardson | 198/53 |
| 2,387,211 | 10/1945 | Barnby et al. | 198/33 AA |
| 2,505,398 | 4/1950 | Harris | 193/43 A |

Primary Examiner—Evon C. Blunk
Assistant Examiner—Joseph E. Valenza
Attorney, Agent, or Firm—Karl A. Limbach et al.

[57] ABSTRACT

Apparatus for orienting randomly disposed cylindrical containers on a conveyer having a stationary incline bed which has two perforated portions across the bed with vacuum suction at the perforated portion, and having parallel guide rods horizontally spanning the incline bed and movable up the incline face pushing containers randomly disposed between the guide rods. The guide rods, which are spatially displaced from the incline bed, move immediately adjacent the bed at the perforated portions, dropping containers having their cylindrical surface against the incline bed and retaining containers having their ends against the incline bed with assistance from the vacuum suction at the perforated portion.

9 Claims, 4 Drawing Figures

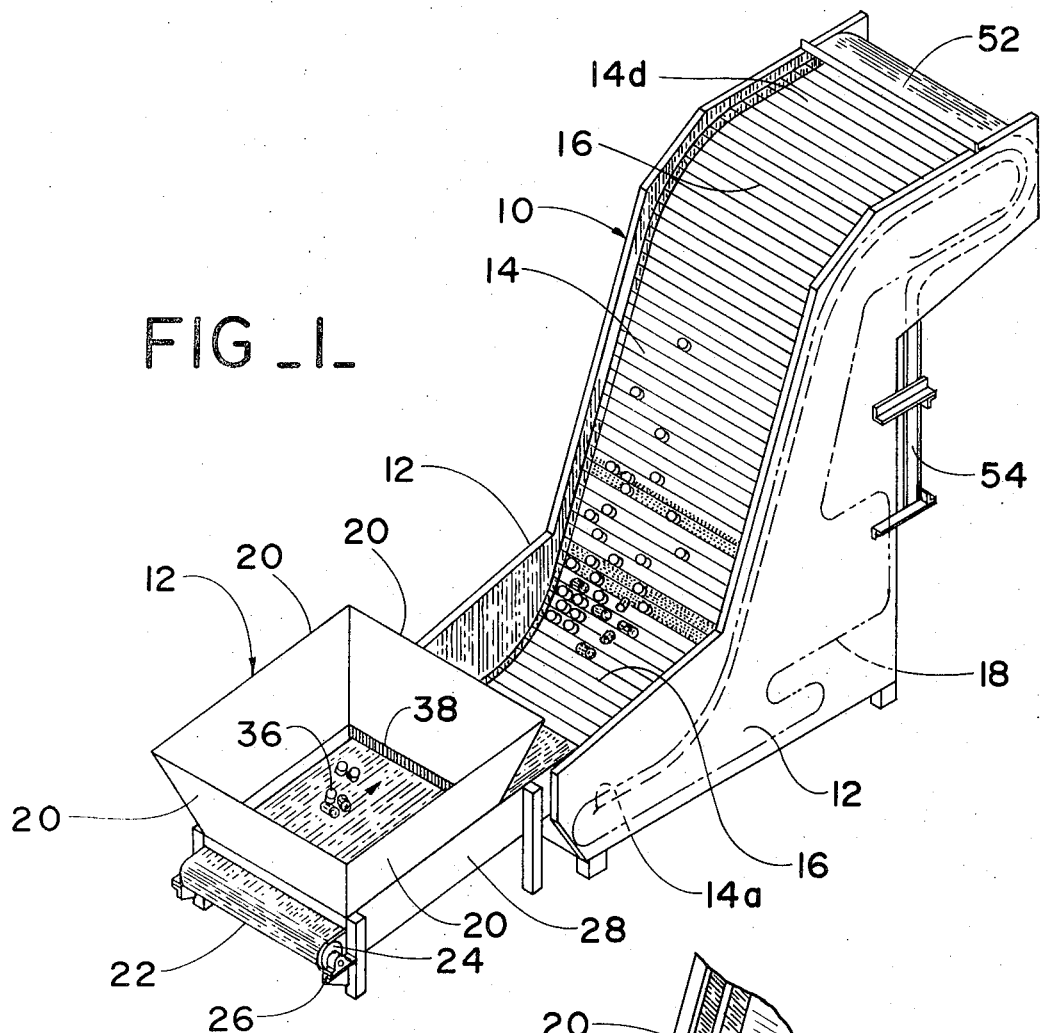
FIG_1_
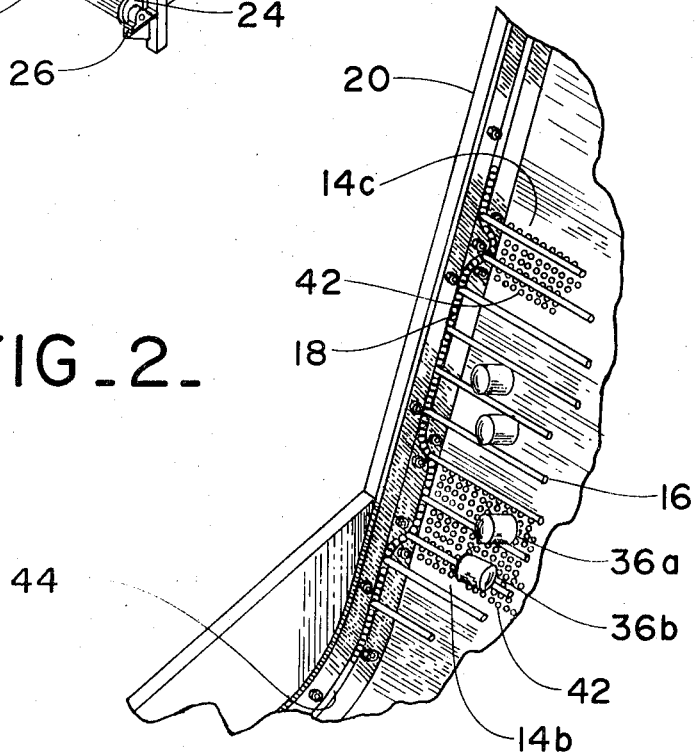
FIG_2_

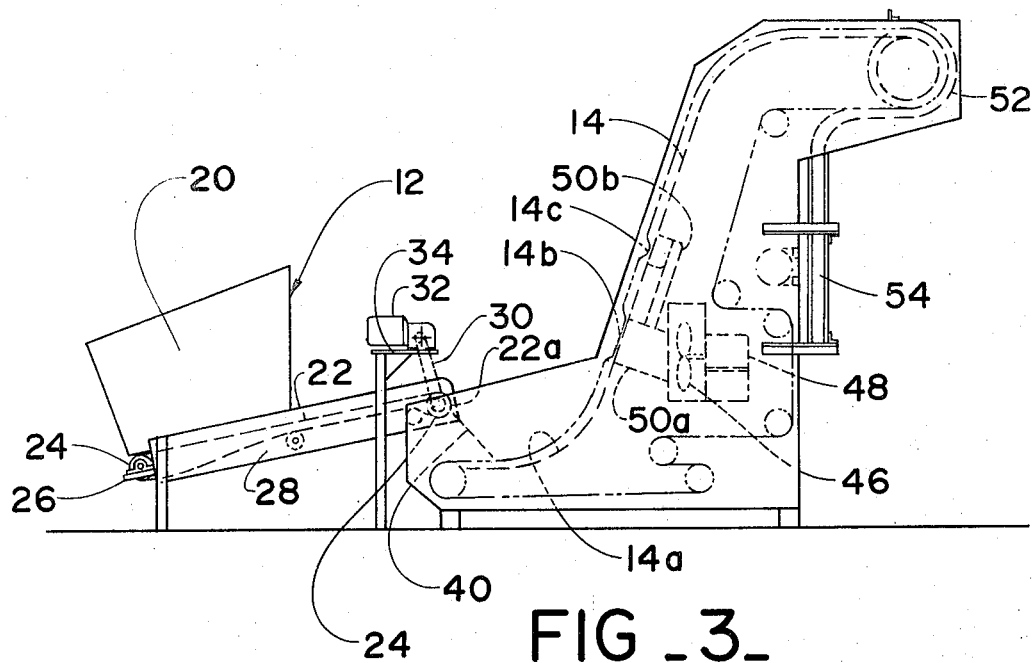
FIG _3_
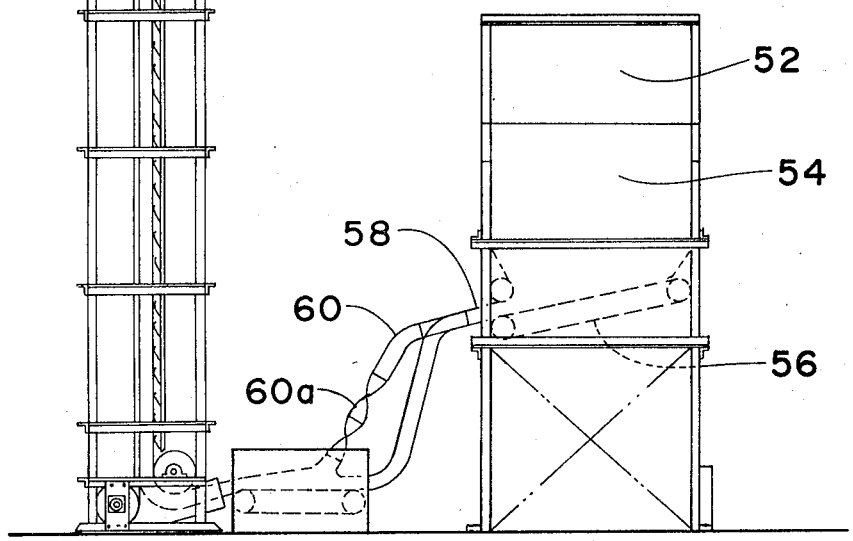
FIG _4_

VACUUM ASSIST CAN UNSCRAMBLER

BACKGROUND OF THE INVENTION

The invented vacuum assist can unscrambler permits a greatly increased number of randomly oriented cans to be unscrambled for delivery to any of a variety of processing operations requiring containers to be oriented in a specific manner. The vacuum assist greatly improves the handling capacity of similar types of can unscramblers known in the art.

Heretofore, can unscramblers using an incline bed and horizontal guide rods to raise randomly oriented open-end cans up the bed have utilized the instability of the improperly oriented can for selective rejection. In such devices, the guide rods move up the incline bed while spaced therefrom carrying the cans against the bed and the rods. At a selected point on the incline bed, the bed is adjusted outward towards the rods creating an unstable condition for improperly oriented cans. Cans which have been rolling up the incline bed on their cylindrical surface and cans having their heavier closed end cantilevered away from the bed fall from the control of the rod which acts as a fulcrum over which the unstable cans will fall to be picked up by the guide rods below. Those cans which are not rejected are aligned in single file and conveyed to the next station in a contemplated process in which the cans are used. The rejected cans are picked up by the lower rods to again be subjected to the trial and error orientation process.

The principal problem in a device of this nature is that cans which have approximately the same diameter as their length or a smaller diameter than their length tend to roll up the incline bed and not be rejected during the outward adjustment of the bed rowards the guide rod. The problem is compounded when a device of this nature is operated at increased speed in the attempt to increase the output capacity of the device. Furthermore, at increased operating speeds improperly oriented cans are not rejected because they are carried up the unscrambler by riding on other cans. At increased speeds cans which are backwards no longer are uniformly rejected and require subsequent orientation by a flange divider which separates cans according to the orientation of a flange at the open end and inverts line of separated cans before returning them to be comingled with the correctly oriented cans.

While a flange divider provides a solution to backward oriented cans, it does not solve the problem of correcting the orientation of cans which are sideways and roll up the incline bed.

SUMMARY OF THE INVENTION

The invention comprises an improved apparatus for unscrambling randomly oriented cans or like containers which can be operated at a greatly increased handling capacity over prior devices of this type. By employing a vacuum assist in a portion of the incline bed, a guide rod can drop to immediately adjacent the bed to allow all cans which are sideways oriented to roll over the rod. Cans having either end oriented against the incline bed are retained against the bed by the vacuum assist. The vacuum assist is formed by a plurality of small spaced holes in the surface of the incline bed through which air is drawn by a suction fan at the underside of the bed. With the vacuum assist, the capacity of a can unscrambler can be increased from 400 cans per minute to 700 to 800 cans per minute. At this operating capacity, a few improperly oriented cans can become locked between cans under vacuum assist and fail to be discharged. This minor problem can be eliminated by a second vacuum assist higher up on the incline which can reject improperly oriented cans after the cans have had an opportunity to adjust across the guide rods under less congested conditions.

Cans which are properly oriented are conveyed to a restricted hopper which maintains their orientation and discharges them one at a time in single file to a flange divider. The flange divider separates the cans according to the orientation of a flange at the open end and inverts one of the separated groups of cans before comingling them with the other cans. The uniformly oriented cans can then be elevated for conveyance to the next station in a canning process.

While the invention is most suitable for aluminum extrusion molded cans, it can be employed to unscramble steel, plastic or other containers of a similar nature.

BRIEF DESCRIPTION OF THE DRAWINGS

FIG. 1 is a perspective view of the can unscrambler and a receiving hopper.

FIG. 2 is an enlarged view of a portion of the can unscrambler of FIG. 1.

FIG. 3 is a side elevational view of the can unscrambler and receiving hopper of FIG. 1.

FIG. 4 is a rear elevational view of the can unscrambler and discharge elevator.

DETAILED DESCRIPTION OF THE INVENTION

Referring to FIG. 1, the vacuum assist can unscrambler 10 is shown in combination with a receiving hopper 12 into which cans to be oriented are dumped. The can unscrambler 10 has two vertical sides 12 between which is a wide incline bed 14. Above the bed 14 are a plurality of parallel guide rods 16 which are conveyed on an endless chain 18 up and around the incline bed 14.

The hopper 12 has four substantially vertical sides 20 which contain cans dumped therein on a conveyor belt 22. The conveyor belt 22 rides around rollers 24 supported by bearing brackets 26 attached to the hopper support structure 28 which positions the conveyor belt 22 over the bottom end 14a of the incline bed 14, as shown in greater detail in FIG. 3. The conveyor belt 22 is driven by a belt 30 from a small electrical motor 32 mounted on a bracket 34 attached to the hopper support structure 28.

Cans 36 deposited in the hopper 12 pass under an exit flat 38 shown in FIG. 1 and are conveyed to the forward end 22a of the conveyor belt 22 to drop down a slide 40, shown in phantom in FIG. 3 onto the lower end 14a of the incline bed 14. Here the cans 36 are lodged between the plurality of guide rods 16 which convey the cans 36 up the incline bed 14.

Referring to the enlarged view in FIG. 2, a portion of the can unscrambler is shown in greater detail. The incline bed 14 at a first horizontal portion 146 and at a second horizontal portion 14c contains a plurality of uniformly spaced perforations 42. The perforations enable the bed 14 to be air pervious. In each of vertical side walls 20 (one shown in FIG. 2) is a chain guide 44 which cams the endless chain 18 supporting the guide rods 16 to abruptly dip immediately adjacent the incline bed 14 at each perforated portion 14b and 14c as shown in FIG. 2. Air is drawn through the perforations 42 by an exhaust fan 46 and motor 48 which create a mild suction at each perforated portion 14b and 14c through air ducts 50a and 50b, schematically shown in phantom in FIG. 3. Cans which are oriented with either end against the incline bed such as exemplar can 36a in FIG. 2 are retained against the incline bed by the mild suction at the perforations. Cans such as exemplar can 36b in FIG. 2 with its cylindrical edge adjacent the incline bed are unable to be retained by the suction at the perforations and drop because of the lost support of its guide rod 16 which moves immediately adjacent the incline bed 14 to only convey properly oriented cans maintained against the incline bed 14 by the mild vacuum assist through the perforations 42.

Cans 36 which drop are picked up between other guide rods and are conveyed again to the perforated portion 14b to again be subjected to a retention or rejection process along with additional cans from the hopper 12. Improperly oriented cans which manage to be retained after passing the perforated portion 14b by being stacked or wedged between properly oriented cans readjust their position in the less congested area between the perforated portions 14b and 14c of the incline bed 14. These cans are then again subjected to a vacuum assist and loss of guide rod support by the perforated portion 14c, thereby insuring that all cans conveyed to the upper end 14d of the incline bed 14 are oriented with one end against the bed.

At the upper end 14d of the bed 14 the cans 36 are captured by a cover plate 52 shown in FIG. 1 and channeled to a temporary storage hopper 54 shown in FIGS. 1, 3 and 4. In the temporary storage hopper 54 the cans 36 are urged to a single filer 56 by a short conveyer belt arrangement 58 shown in phantom in FIG. 4. The single filer 56 includes a flange divider 60 of a conventional type which separates the cans of inverted orientation by the flared open end of the can. The separated cans are then inverted by a twist 60a in the single filer 56 and returned to the line of properly oriented cans.

Once the orientation operation is completed, the cans may be conveyed to the next step in a processing operation. For example, as shown in FIG. 4, the cans may be conveyed to an elevator 62 which raises the cans in single file to a gravity feed operation which is the next step in any of a variety of operations.

I claim:

1. A can unscrambler for orienting cans comprising:
   a stationary incline bed,
   suction means for holding cans with their end oriented against the bed, said suction means arranged across a portion of said incline bed, and
   guide means for conveying only cans held against said bed across said suction means, said guide means comprising: a plurality of parallel rods extending across said incline bed and movable up said incline bed, said rods being adapted to transport cans located between adjacent rods, and conveyer means connected to the ends of said rods for moving said rods up said incline bed and further for moving said guide rods from a first position displaced from said incline bed, wherein cans are conveyed and supported against said incline bed by said rods, to a second position immediately adjacent said incline bed at said portion of said bed where said suction means is arranged, wherein cans are selectively conveyed by said rods and selectively supported against said incline bed by said suction means.

2. The can unscrambler of claim 1 wherein said suction means comprises an air pervious portion in the incline bed and an exhaust means under said bed.

3. The can unscrambler of claim 2 wherein said exhaust means comprises an exhaust fan and air ducts under said incline bed in the area of said air pervious portion of said incline bed.

4. A can unscrambler for orienting cans comprising:
   a stationary incline bed;
   a perforated portion across said incline bed having a plurality of perforations therein;
   suction means for developing a vacuum suction through said perforations in said portion of said incline bed for selectively holding cans against said bed;
   a plurality of parallel guide rods extending across said incline bed and movable up said incline bed, said guide rods adapted to transport cans located between adjacent guide rods up said incline bed; and
   means for moving said guide rods up said incline bed and further for moving said guide rods from a first position displaced from said incline bed, wherein cans are conveyed and supported against said incline bed by said guide rods, to a second position immediately adjacent said incline bed at said perforated portion of said bed, wherein cans are selectively conveyed by said guide rods and selectively supported against said incline bed by said suction means.

5. The can unscrambler of claim 4 wherein said means comprises a pair of endless chains to which said rods are connected and a chain guide at each side of said bed in which said chains are conveyed, said guide running along said bed from a position displaced from said bed to a position immediately adjacent said bed at said perforated portion.

6. The can unscrambler of claim 4 having further a second perforated portion on said incline bed having a plurality of perforations and further means to move said guide rods from a first position displaced from said incline bed to a second position immediately adjacent said incline bed at said second perforated portion of said bed.

7. The can unscrambler of claim 6 in combination with a receiving hopper in which cans are randomly deposited having a conveyor to deliver a flow of cans to the unscrambler.

8. The can unscrambler of claim 6 in combination with a single filer which orders cans in a single file line.

9. The can unscrambler of claim 8 in combination with a flange divider having means to separate cans having flanges oriented in a first direction from identical cans oriented in a second inverted direction and to return them to a single file line.

* * * * *